US011423012B2

(12) United States Patent
Jun et al.

(10) Patent No.: US 11,423,012 B2
(45) Date of Patent: Aug. 23, 2022

(54) ELECTRONIC DEVICE FOR PROHIBITING LOSS OF DATA IN DATABASE AND METHOD FOR OPERATING THE SAME

(71) Applicant: Samsung Electronics Co., Ltd., Suwon-si (KR)

(72) Inventors: Hyeeun Jun, Suwon-si (KR); Kiwon Song, Suwon-si (KR); Kisung Lee, Suwon-si (KR); Woojoong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 15/931,071

(22) Filed: May 13, 2020

(65) Prior Publication Data
US 2021/0042293 A1 Feb. 11, 2021

(30) Foreign Application Priority Data
Aug. 6, 2019 (KR) ........................ 10-2019-0095323

(51) Int. Cl.
*G06F 16/23* (2019.01)
*G06F 11/14* (2006.01)
*G06F 16/178* (2019.01)

(52) U.S. Cl.
CPC ...... *G06F 16/2379* (2019.01); *G06F 11/1464* (2013.01); *G06F 16/178* (2019.01); *G06F 2201/80* (2013.01)

(58) Field of Classification Search
CPC .................................................. G06F 16/2379
See application file for complete search history.

(56) References Cited

U.S. PATENT DOCUMENTS

| 10,198,321 B1* | 2/2019 | Gordon ............... G06F 11/1448 |
| 2016/0321144 A1 | 11/2016 | Zankl et al. |
| 2017/0193005 A1* | 7/2017 | Won ........................ G06F 16/27 |
| 2020/0364211 A1* | 11/2020 | Li .......................... G06N 3/006 |

FOREIGN PATENT DOCUMENTS

KR 10-2019-0021773 A 3/2019

* cited by examiner

*Primary Examiner* — Van H Oberly
(74) *Attorney, Agent, or Firm* — Jefferson IP Law, LLP

(57) ABSTRACT

An electronic device and a method for operating the electronic device are provided. The electronic device includes a first memory, a second memory configured to store therein journal data including an operation result of a transaction for data in the database and metadata, and at least one processor configured to detect an occurrence of the transaction, identify characteristics of a database system to which the data corresponding to the transaction belongs and characteristics of a file system, determine whether to create a thread for synchronizing the metadata stored in the second memory with the first memory based on the characteristics of the file system and the characteristics of the database system, and synchronize the metadata with the first memory using the created thread corresponding to identifying that the transaction of the data satisfies a condition related to a degree of change of time of the data.

19 Claims, 10 Drawing Sheets

ELECTRONIC DEVICE FOR PROHIBITING LOSS OF DATA IN DATABASE AND METHOD FOR OPERATING THE SAME

CROSS-REFERENCE TO RELATED APPLICATION(S)

This application is based on and claims priority under 35 U.S.C. § 119(a) of a Korean patent application number 10-2019-0095323, filed on Aug. 6, 2019, in the Korean Intellectual Property Office, the disclosure of which is incorporated by reference herein in its entirety.

BACKGROUND

1. Field

The disclosure relates to an electronic device and a method for operating the electronic device. More particularly, the disclosure relates to a technology to prohibit a loss of data in a database of an electronic device.

2. Description of Related Art

Various electronic devices, such as a smart phone, a tablet (personal computer) PC, a portable multimedia player (PMP), a personal digital assistant (PDA), a laptop personal computer (laptop PC), and a wearable device, have been spread.

In order to provide various user experiences, an electronic device may store various kinds of data. In order to operate various kinds of data, an electronic device, in the same manner as a computer system in the related art, may include a storage device hierarchy including a main memory (e.g., random access memory (RAM)) and a storage that is a mass storage device, and the various kinds of data may constitute a database system implemented by various structures.

During an operation of the electronic device, the database system may be corrected through reflection of corrections of a database, and if an unexpected power problem or an interrupt caused by a system crash occurs on the electronic device, data in the database may be partially damaged. To cope with such a situation, a database journaling system may be implemented. The database journaling system is a system which creates a journaling file including changes before reflecting the changes in the database, and updates the database using the created file.

The database may reflect the changes through various journaling schemes and various synchronization schemes.

The above information is presented as background information only to assist with an understanding of the disclosure. No determination has been made, and no assertion is made, as to whether any of the above might be applicable as prior art with regard to the disclosure.

SUMMARY

In the case of a database operating in a specific journaling method and in a specific synchronization mode, for the reason of performance improvement, synchronization may not be performed with respect to journal data including changes of a database temporarily stored in a volatile memory and metadata for indicating a file of which the changes occur. For example, an electronic device that is implemented by an android operating system may not perform periodic synchronization with respect to a database manager operating in a write ahead logging (WAL) journal mode and in a normal synchronization mode. In this case, the journal data may not be synchronized with the database stored in a nonvolatile memory. Further, if a specific situation occurs (e.g., if an abrupt power-off of an electronic device or an abrupt restart of the electronic device occurs due to various causes), a phenomenon that the journal data stored in the volatile memory is unable to be recovered may occur. The phenomenon that the journal data is unable to be recovered may cause a loss of mass data.

Aspects of the disclosure are to address at least the above-mentioned problems and/or disadvantages and to provide at least the advantages described below. Accordingly, an aspect of the disclosure is to provide an electronic device and a method for operating the electronic device to prohibit a data loss phenomenon.

Additional aspects will be set forth in part in the description which follows and, in part, will be apparent from the description, or may be learned by practice of the presented embodiments.

In accordance with an aspect of the disclosure, an electronic device is provided. The electronic device includes a first memory configured to store a database therein, a second memory configured to store therein journal data including an operation result of a transaction for data in the database and metadata including address information of the data that is a target of the transaction, and at least one processor, wherein the at least one processor is configured to detect an occurrence of the transaction, identify characteristics of a database system to which the data corresponding to the transaction belongs and characteristics of a file system in which the database system is implemented corresponding to the detection of the occurrence of the transaction, determine whether to create a thread for synchronizing the metadata stored in the second memory with the first memory based on the characteristics of the file system and the characteristics of the database system, and synchronize the metadata with the first memory using the created thread corresponding to identifying that the transaction of the data satisfies a condition related to a degree of change of the data or a condition related to a change time of the data.

In accordance with another aspect of the disclosure, a method for operating an electronic device is provided. The method includes detecting an occurrence of a transaction for data in a database stored in a first memory, identifying characteristics of a database system to which the data corresponding to the transaction belongs and a file system in which the database system is implemented corresponding to the detection of the occurrence of the transaction, determining whether to create a thread for synchronizing, with the first memory, journal data including an operation result of the transaction stored in a second memory and metadata including address information of the data that is a target of the transaction based on the characteristics of the file system and the database system, and synchronizing the journal data or the metadata with the first memory using the created thread corresponding to identifying that the transaction of the data satisfies a condition related to a degree of change of the data or a condition related to a change time of the data.

According to the electronic device and the method for operating the electronic device according to various embodiments of the disclosure, it is possible to identify the characteristics of the database system to which the data that is the target of the transaction belongs and to create the thread for synchronizing the journal data based on the attribute of the file system. Accordingly, it is possible to implement the synchronization of the database of which the synchronization has not been performed, and thus the loss of the data can be prohibited.

According to the electronic device and the method for operating the electronic device according to various embodiments of the disclosure, it is possible to drive the created thread on a background and to perform the synchronization of the database if the specific condition is satisfied. Accordingly, excessively repeated synchronization of the database can be prevented from being performed, and thus the performance of the electronic device can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
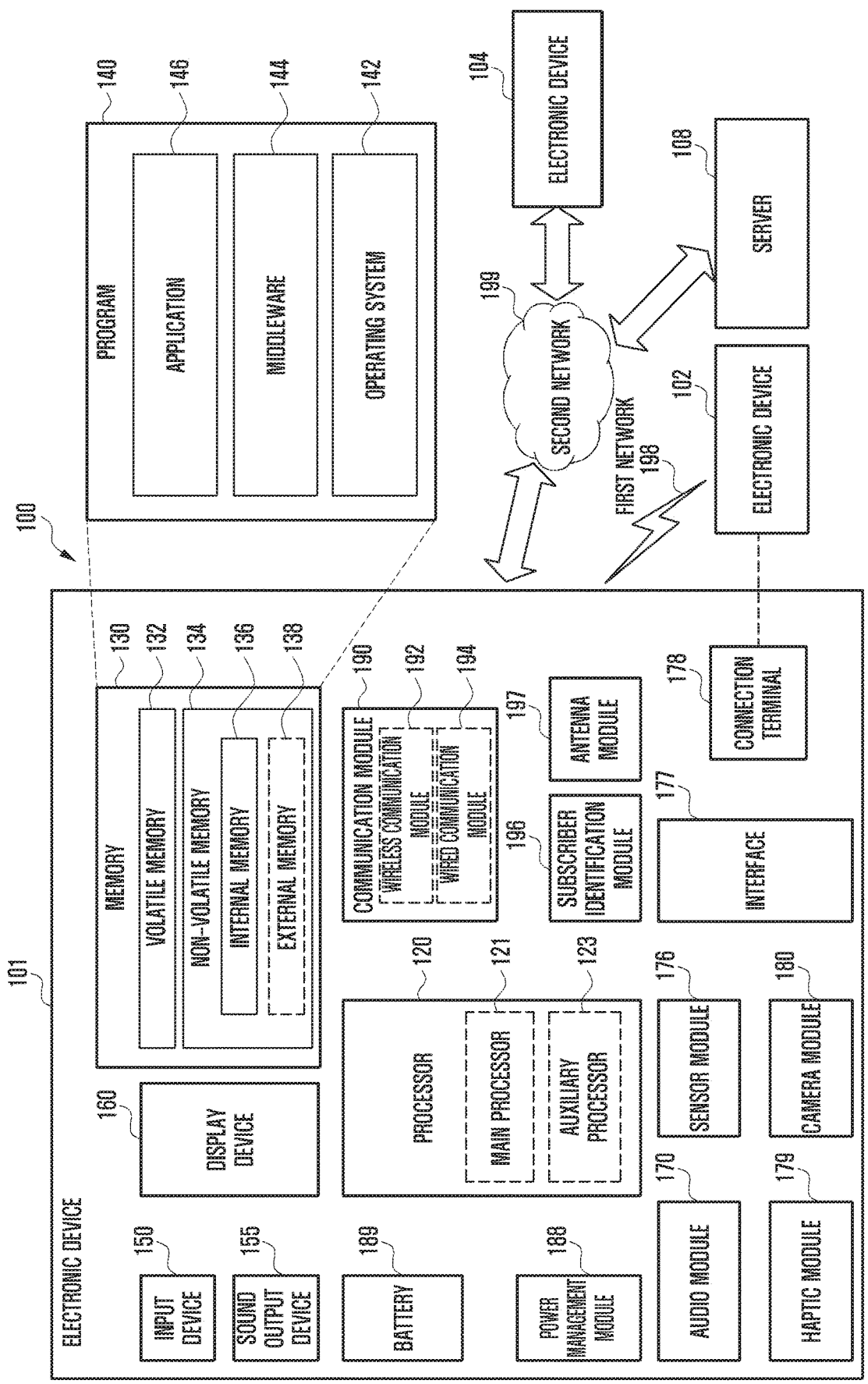
FIG. 1 is a block diagram of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
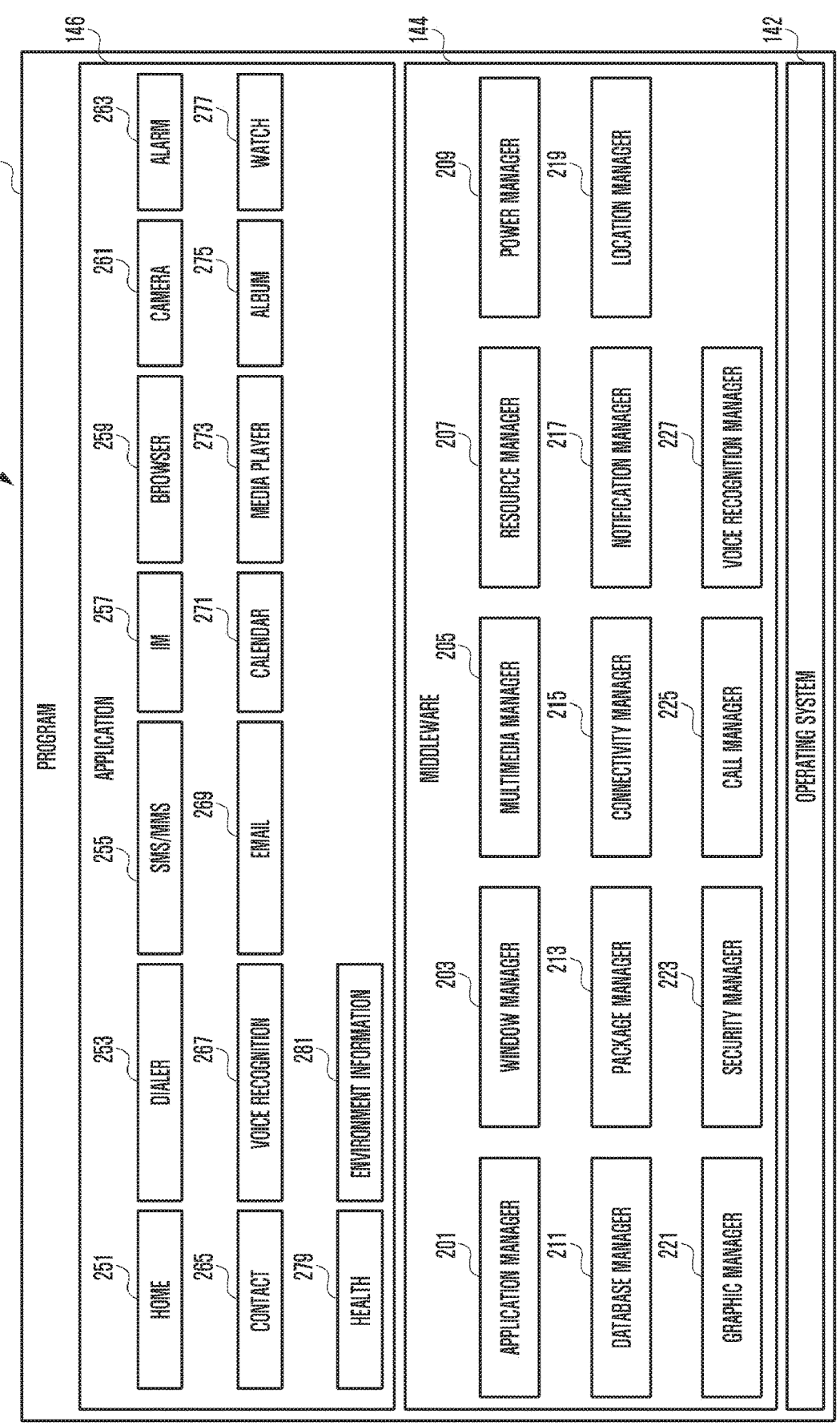
FIG. 2 is a block diagram of a program according to an embodiment of the disclosure.

FIG. 2 is a block diagram 200 illustrating a program according to an embodiment of the disclosure.

Referring to FIG. 2, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be preloaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
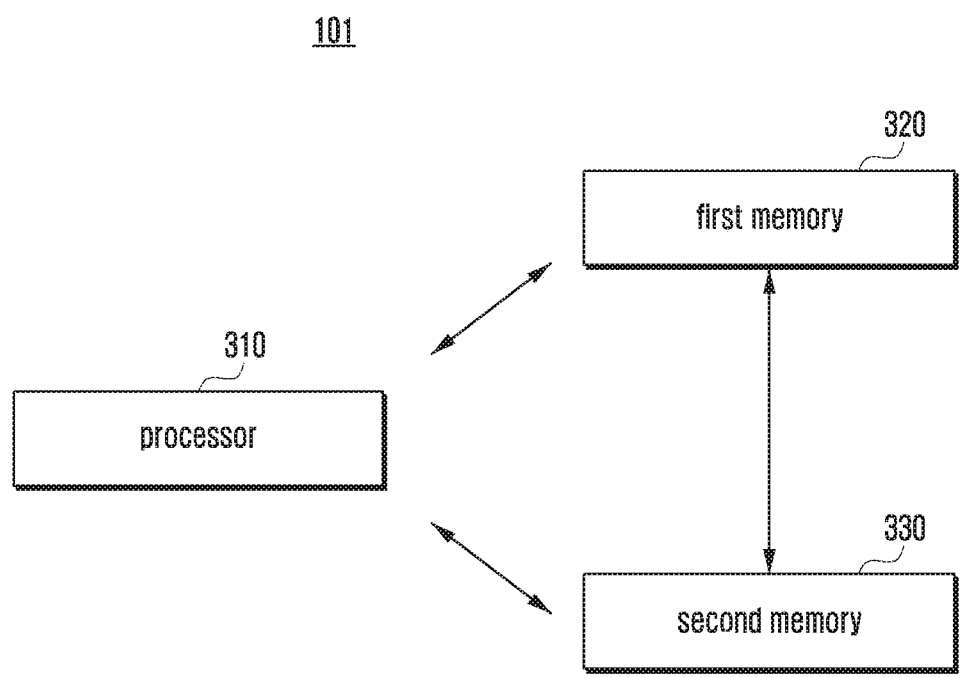
FIG. 3 is a block diagram of an electronic device according to an embodiment of the disclosure.

FIG. 3 is a block diagram of an electronic device according to an embodiment of the disclosure.

Referring to FIG. 3, an electronic device (e.g., electronic device 101 of FIG. 1) according to various embodiments of the disclosure may include a processor 310 (e.g., processor 120 of FIG. 1), a first memory 320 (e.g., nonvolatile memory 134 of FIG. 1), and a second memory 330 (e.g., volatile memory 132 of FIG. 1).

According to various embodiments of the disclosure, the processor 310 may perform an operation related to a control or communication of various constituent elements included in the electronic device 101 or a data process. The processor 310 may electrically be connected to the first memory 320 and the second memory 330. Operations of the processor 310 may be performed by loading instructions stored in the first memory 320. The processor 310 may control a database journaling system implemented by various journaling schemes (e.g., a rollback journal mode that means a scheme to store existing data in a journal file and to replace the existing data by corrected data or a write ahead logging (WAL) mode that means a scheme to store the operation result in a journal file and to update the existing data using the journal file). The database journaling system is a system that creates a file including changes before reflecting the changes in a database and updates the database using the created file. If a power-off or a system error occurs, the database journaling system uses journal data to reduce a possibility of damaging the database.

According to various embodiments of the disclosure, the processor 310 may perform a transaction for the data in the database. The transaction for the data may mean various operations including data write, correct, or delete. The data that is a target of the transaction may be stored in the first memory 320. In order to perform the transaction, the processor 310 may copy the data stored in the first memory 320 to the second memory 330, and may store data for which the transaction is to be performed, journal data including the result of the transaction, and metadata indicating an address of at least a part of the data in which the result of the transaction is to be reflected in the second memory 330.

According to various embodiments of the disclosure, the first memory 320 is a nonvolatile memory, and may be a mass storage device. For example, the first memory 320 may include at least one of one time programmable ROM (OTPROM), PROM, EPROM, EEPROM, mask ROM, flash ROM, flash memory, hard drive, or solid state drive (SSD). The first memory 320 may store a database including various kinds of data, and in accordance with an operation of the processor 310, the database may be updated by the transaction.

According to various embodiments of the disclosure, the second memory 330 may be a memory having an attribute that is different from the attribute of the first memory 320. According to various embodiments, at least a partial region of the second memory 330 may be allocated as a main memory, and the processor 310 may load or temporarily store the data of the first memory 320 in the second memory 330, and may perform an operation of the transaction for the data temporarily stored in the second memory. The processor 310 may store, in the second memory 330, the journal data including the operation result of the transaction and the metadata indicating the address of the data in which the transaction is to be reflected.

According to various embodiments of the disclosure, the processor 310 may perform a synchronization operation to store, in the first memory 320, the journal data and the metadata temporarily stored in the second memory 330.

According to various embodiments of the disclosure, the processor 310 may reflect corrected data in the database stored in the first memory 320 using the journal data and the metadata stored in the first memory 320. An operation of reflecting the corrected data in the database is defined as a check point.

According to various embodiments of the disclosure, at least a partial region of the second memory 330 may be allocated as a storage device, and the processor 310 may store the journal data and the metadata in the second memory 430. In general, a memory that is used as the main memory is a kind of volatile memory, such as a dynamic random access memory (DRAM), a static RAM (SRAM), or a synchronous dynamic RAM (SDRAM), and if a power being supplied to the electronic device is cut off, the data recorded in the volatile memory may be deleted.

According to various embodiments of the disclosure, the processor 310 may perform various types of synchronization for storing, in the first memory 320, the journal data and the metadata stored in the second memory 330 in accordance with a synchronization mode of the database. For example, the synchronization mode of the database may include a synchronization mode for performing synchronization for the database whenever the transaction of the data is completed (e.g., full synchronization mode), a synchronization mode for performing synchronization for the database if a specific condition is satisfied (e.g., normal synchronization mode), and a synchronization mode for not performing a separate synchronization (e.g., off).

According to various embodiments, the electronic device 300 may not perform the synchronization for the data that is the target of the transaction due to various problems including a performance problem in the database operating in a specific journaling scheme and in a specific synchronization mode. For example, the electronic device implemented by the android operating system may not perform a periodic synchronization for the database operating in a WAL journal mode and in a normal synchronization mode. In this case, the metadata may not be stored in the first memory 320. Further, if a specific situation (abrupt power-off or abrupt restart of the electronic device 101 due to various causes) occurs, a phenomenon that the metadata is unable to be recovered may occur due to the characteristics of the second memory 330 that is a volatile memory. If the metadata is unable to be recovered, the address of the data in which the journal data is to be reflected is unable to be identified, and a loss of mass data may occur. Hereinafter, detailed embodiments in which synchronization is performed to prevent the above-described phenomenon in the case of a specific file system will be described.

According to various embodiments of the disclosure, the processor 310 may detect the occurrence of the transaction for the data in the database. The transaction may mean various operations including data write, correct, or delete.

According to various embodiments of the disclosure, the processor 310 may identify the characteristics of the database system including the data that is the target of the transaction corresponding to the detection of the occurrence of the transaction. Attributes of the database system may include a journaling scheme of the database system (e.g., a rollback journal mode that means a scheme to store existing data in a journal file and to replace the existing data by corrected data or a write ahead logging (WAL) mode that means a scheme to store the operation result in a journal file and to update the existing data using the journal file) and a synchronization scheme of the database system (e.g., a full synchronization mode that is a synchronization mode for performing synchronization for the database whenever the transaction of the data is completed, a normal synchronization mode that is a synchronization mode for performing synchronization for the database if a specific condition is satisfied, and a synchronization off mode for not performing a separate synchronization.

According to various embodiments of the disclosure, the processor 310 may determine whether to create a thread for synchronizing, with the database, the metadata indicating the address of the data in which the operation result of the transaction is to be reflected based on the characteristics of the database system.

According to various embodiments of the disclosure, the journal data and the metadata may be stored in the second memory 330 that is a volatile memory, and the database may be stored in the first memory 320 that is a nonvolatile memory. The thread for synchronizing the journal data or the metadata with the database may mean a series of operation units to create a command (e.g., fsync command or fdatasync command) for storing, in the first memory 320, the journal data or the metadata stored in the second memory and to make the processor 310 operate using the created command. The thread for synchronizing the journal data or the metadata with the database may operate on a background.

According to various embodiments of the disclosure, the processor 310 may identify the characteristics of the database system including the data corresponding to the transaction and the characteristics of the file system in which the database system is implemented, and may identify whether the database system corresponds to a database system having high risks of data loss based on the characteristics of the file system and the characteristics of the database system. The processor 310 may identify whether the file system in which the database system is implemented has the characteristics that the journal data or the metadata is not periodically synchronized. The processor 310 may determine that a system in which a signal (e.g., fsync or fdatasync) for synchronizing the journal data or the metadata is not created corresponding to the occurrence of the transaction is a database system having high risks of data loss.

For example, if the file system in which the specific database system is implemented corresponds to the file system (e.g., file system in which the data is not periodically synchronized) having a high possibility of a loss of data (e.g., journal data or metadata), the journaling type of the specific database system is the WAL mode, and the synchronization type is set to the normal mode, the specific database system corresponds to the system in which the signal (e.g., fsync or fdatasync) for synchronizing the journal data or the metadata is not created corresponding to the occurrence of the transaction, and this system may correspond to the database system having high risks of data loss.

As another example, if the file system in which the specific database system is implemented corresponds to the file system (e.g., file system in which the data is not periodically synchronized) having a high possibility of a loss of data (e.g., journal data or metadata), and the synchronization type of the specific database system is set to the off mode, the specific database system corresponds to the system in which the signal (e.g., fsync or fdatasync) for synchronizing the journal data or the metadata is not created corresponding to the occurrence of the transaction, and this system may correspond to the database system having the high risks of data loss.

According to various embodiments of the disclosure, the processor 310 may identify the characteristics of the file system implemented on the first memory 320 at various time points (e.g., the time when the file system is created or the time when the characteristics of the file system are changed), and may first determine whether the file system is the file system having the high possibility of data loss. If the file system is the file system in which the journal data or the metadata stored in the second memory 330 is not periodically synchronized with the first memory 320, the corresponding file system may correspond to the file system having the high possibility of data loss.

According to various embodiments of the disclosure, the processor 310 may determine whether the database system is the system in which the signal for synchronizing the journal data or the metadata is not created corresponding to identifying that the file system in which the database system is implemented corresponds to the file system having the high possibility of data loss. The processor 310 may create data indicating whether the database system is the database system having the high possibility of data loss, and may identify the characteristics of the database system and whether the database system is the database system having the high data loss using the created data. The created data may be implemented in various forms including information on the database system, the characteristics of the database system, or whether the database system is the database system having the high data loss and the kind corresponding to a mapping table or the database system having the high data loss.

According to various embodiments of the disclosure, the processor 310 may create the thread for storing the journal data or the metadata in the first memory 320 by identifying that the database system is the system in which the signal (e.g., fsync or fdatasync) for synchronizing the journal data or the metadata is not created and by intentionally creating the specific signal (e.g., fsync or fdatasync).

According to various embodiments of the disclosure, the processor 310 may create the thread for synchronizing the journal data or the metadata, and may operate the thread on the background. The thread operation may be performed independently of various operations (e.g., data transactions). The processor 310 may synchronize the journal data or the metadata using the created thread corresponding to identifying that the data transaction satisfies a specific condition.

According to various embodiments, the specific condition may include a condition related to a change time of the data. The condition related to the change time of the data may include a condition that means whether a predetermined time has elapsed after a commit operation reflecting a completed data transaction in the journal data is performed. After the commit operation is performed, the processor 310 may activate a timer, and may identify whether the predetermined time has elapsed. The processor 310 may perform synchronization of the journal data or the metadata using the thread corresponding to identifying that the predetermined time has elapsed after the commit operation is performed. The processor 310 may reset the timer corresponding to identifying that another data transaction occurs or another commit operation is performed while the predetermined time has elapsed after the commit operation is performed. The processor 310 may identify whether the predetermined time has elapsed, and may perform the synchronization of the journal data or the metadata using the thread corresponding to identifying that the predetermined time has elapsed. The above-described operation will be described later with reference to FIGS. 6 to 7C.

According to various embodiments of the disclosure, the specific condition may include the condition related to the degree of change of the data. The condition related to the degree of the change of the data is a variable capable of representing the degree of the change of the data (e.g., the number of data transaction calls or the number of updated pages among pages that are data sets), and may mean the condition on which the variable capable of representing the degree of the change is equal to or larger than (or exceeds) a specific value. Data of the variable representing the degree of the change of the data may be included in the database or the journal data. The processor 310 may identify whether the data transaction satisfies the specific condition at the time when the data transaction is terminated, and may perform the synchronization of the journal data or the metadata using the thread corresponding to identifying that the specific condition is satisfied. The above-described operation will be described later with reference to FIG. 8.

As described above, the electronic device 101 according to various embodiments of the disclosure may create the thread for storing the journal data or the metadata in the first memory 320 with respect to the database system having the characteristics that a separate synchronization is not performed with respect to the journal data or the metadata, and the electronic device 101 may store the journal data or the metadata in the first memory 320 using the created thread. Accordingly, the electronic device 101 can prohibit a loss of massive data.

Figure 4:
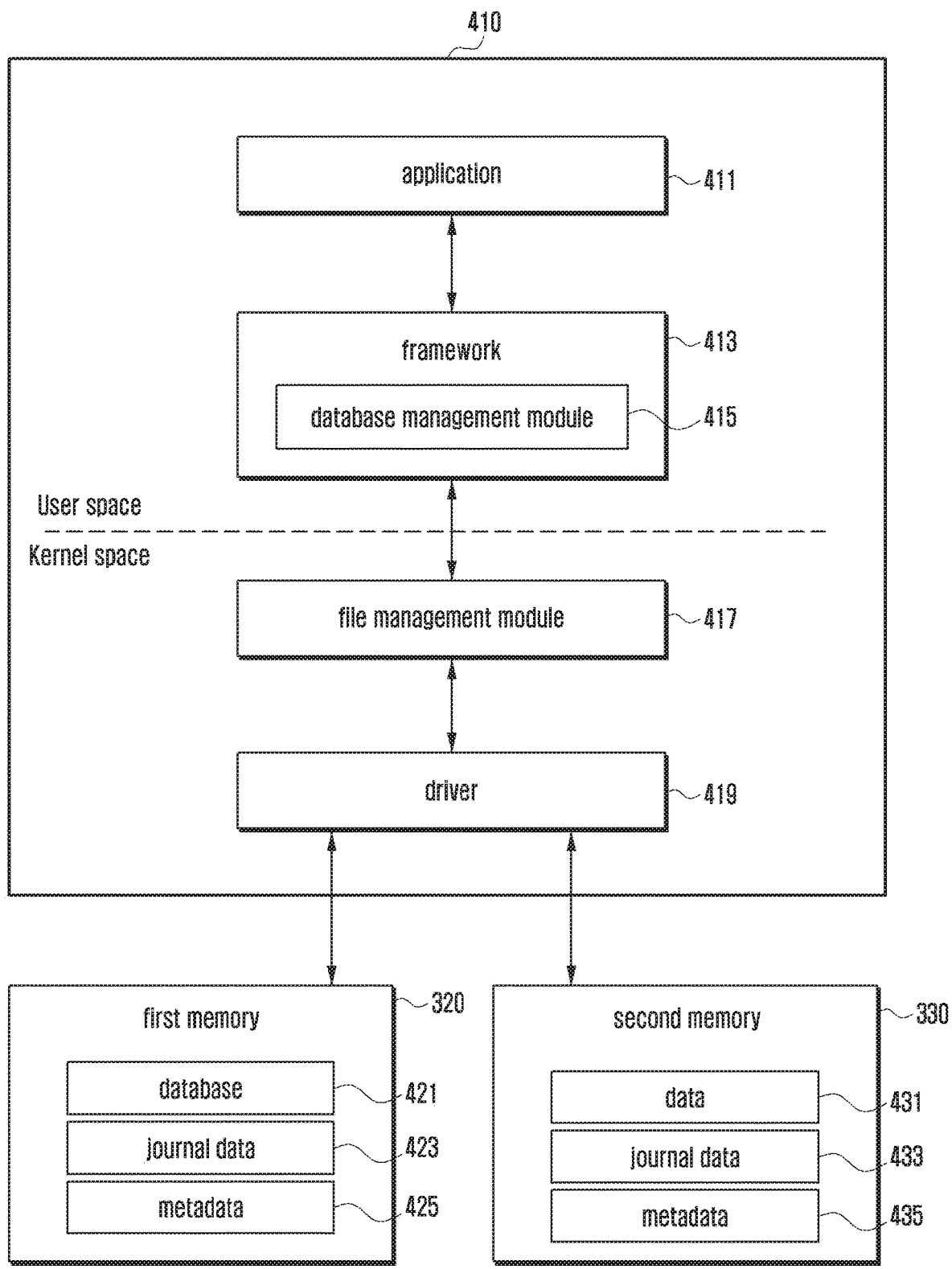
FIG. 4 is a diagram illustrating a software hierarchy of an electronic device according to an embodiment of the disclosure.

FIG. 4 is a diagram illustrating a software hierarchy of an electronic device according to an embodiment of the disclosure.

Referring to FIG. 4, a program module 410 may include a user space and a kernel space. The program module 410 may be implemented on a processor (e.g., processor 310 of FIG. 3). On the user space, an application 411, a framework 413, and a database management module 415 may be implemented, and on the kernel space, a file management module 417 and a driver 419 may be implemented.

According to various embodiments of the disclosure, the application 411 may include a plurality of applications (e.g., applications 146 of FIG. 2) operating on the electronic device. The application 411 may read and write data temporarily or non-temporarily stored in the first memory 320 or the second memory 330. The application 411 may correspond to a database management program, and the application 411 may create and manage database files and database backup files.

According to various embodiments of the disclosure, the framework 413 may provide various functions so that functions or information being provided from one or more resources of the electronic device 101 can be used by the application 411. The database management module 415 may be implemented on the framework 413, and the database management module 415 may support data input or output between the application 411 and the file management module 417.

According to various embodiments of the disclosure, the database management module 415 may manage (create and commit) journal data in the unit of a transaction, and may create the thread for performing synchronization to reflect, in the first memory 320, the data 431 or the journal data 433 stored in the second memory 330 based on the characteristics of the database system. The database management module 415 may store the data 431 or the journal data 433 in the first memory 320 using the thread created corresponding to identifying that the data transaction of the database satisfies a specific condition.

According to various embodiments of the disclosure, the file management module 417 may perform management of the file system. The file management module 417 is connected to the application 411 through the framework 413, and may process various commands including write, fsync, and unlink for files transmitted by the application 411.

According to various embodiments, the driver 419 is connected to the database management system 415, the first memory 320, and the second memory 330, and may perform data input/output corresponding to the file input/output.

According to various embodiments of the disclosure, the first memory 320 is a nonvolatile memory, and may be a mass storage device. The first memory 320 may store a database 421 including various kinds of data, journal data 423, and metadata 425. The database 421 may mean a constituent element for storing a plurality of pieces of data. The database 421 may be managed as at least one page into which at least parts of the plurality of pieces of data are grouped. The journal data 423 may be data including corrections of the data that becomes the target of the transaction included in the database 421. The metadata 425 is data explaining the data included in the database 421, and may include address information of which the transaction has been performed. The metadata may be data including data information on the size of the data included in the database 421, a data name, or a storage location of the data. The database 421 may be updated based on the journal data 423 and the metadata 425.

According to various embodiments of the disclosure, the second memory 330 may be a volatile memory. According to various embodiments, at least a partial region of the second memory 330 may be allocated as a main memory, and the database management module 415 may load or temporarily store the data of the first memory 320 in the second memory 330, and may perform an operation of the transaction for the data temporarily stored in the second memory 330. The database management module 415 may store, in the second memory 330, the journal data 433 including the operation result of the transaction and the metadata 435 including the address of the data that is the target of the transaction.

According to various embodiments of the disclosure, the database management module 415 may perform the transaction for the data in the database 421, and may perform a commit operation that is an operation to store the result of the transaction in the data 431. In order to perform the transaction for the data included in the database 421 stored in the first memory 320, the database management module 415 may search for the data in the database 421 for which the transaction is to be performed using the metadata 425 including the address information of the data, and may load the searched data 431 into the second memory 330. After performing the transaction of the data 431, the application 411 may perform the commit operation for reflecting the operation result of the transaction of the database management module 415 in the journal data 433.

According to various embodiments of the disclosure, the database management module 415 may identify the characteristics of the database system including the data that is the target of the transaction and the characteristics of the file system, and may identify whether the database system corresponds to the database system having high risks of data loss based on the characteristics of the file system and the database system. For example, if the file system in which the specific database system is implemented corresponds to the file system (e.g., file system in which the data is not periodically synchronized) having a high possibility of a loss of data (e.g., journal data or metadata), and the database management module 415 may determine that the system in which the signal (e.g., fsync or fdatasync) for synchronizing the metadata 435 stored in the second memory 330 with the first memory 320 is not created is the database system having a high data loss.

According to various embodiments of the disclosure, the database management module 415 may identify that the database system is the database system operating in a journal mode in which the signal (e.g., fsync or fdatasync) for synchronizing the metadata 435 stored in the second memory 330 with the metadata 425 stored in the first memory 320 is not created corresponding to the occurrence of the transaction, and may create the thread for synchronizing the journal data with the first memory 320.

According to various embodiments of the disclosure, the database management module 415 may create the thread for synchronizing the journal data 433 or the metadata 435 with the first memory 320, and may operate the thread on the background. The thread operation may be performed independently of various operations (e.g., data transactions). The database management module 415 may synchronize the journal data 433 or the metadata 435 using the created thread corresponding to identifying that the data transaction satisfies the specific condition.

An electronic device according to various embodiments of the disclosure may include a first memory configured to store a database therein, a second memory configured to store therein journal data including an operation result of a transaction for data in the database and metadata including address information of the data that is a target of the transaction, and at least one processor, wherein the at least one processor is configured to detect an occurrence of the transaction, identify characteristics of a database system to which the data corresponding to the transaction belongs and characteristics of a file system in which the database system is implemented corresponding to the detection of the occurrence of the transaction, determine whether to create a thread for synchronizing the metadata stored in the second memory with the first memory based on the characteristics of the file system and the characteristics of the database system, and synchronize the metadata with the first memory using the created thread corresponding to identifying that the transaction of the data satisfies a condition related to a degree of change of the data or a condition related to a change time of the data.

In the electronic device according to various embodiments of the disclosure, the first memory may be a nonvolatile memory, and the second memory may be a volatile memory.

In the electronic device according to various embodiments of the disclosure, an attribute of the database system may include a journaling type of the database system or a synchronization type of the database system.

In the electronic device according to various embodiments of the disclosure, the processor may determine to create the thread corresponding to identifying that the journaling type of the database system is set to a WAL mode, and the synchronization type of the database system is set to a normal mode.

In the electronic device according to various embodiments of the disclosure, an attribute of the database system may include an attribute indicating whether a signal for synchronizing the metadata with the database is created corresponding to the occurrence of the transaction, and the processor may be configured to determine to create the thread corresponding to identifying that the file system does not correspond to a file system periodically synchronizing the journal data or the metadata with the first memory, and the database system is a database system having characteristics that the signal for synchronizing the metadata is not created.

In the electronic device according to various embodiments of the disclosure, the processor may be configured to update the journal data and the metadata stored in the second memory based on the operation result of the transaction.

In the electronic device according to various embodiments of the disclosure, the processor may be configured to: update the journal data so as to reflect the operation result of the transaction stored in the second memory corresponding to the occurrence of the transaction, store the journal data and the metadata in the first memory, and update the database based on the journal data and the metadata stored in the first memory.

In the electronic device according to various embodiments of the disclosure, the condition related to the degree of the change of the data may include a condition on which the number of updated pages among pages included in the database is equal to or larger than a predetermined value, and the processor may be configured to store the journal data or the metadata in the first memory corresponding to identifying that the number of updated pages is equal to or larger than the predetermined value.

In the electronic device according to various embodiments of the disclosure, the condition related to the degree of the change of the data may include a condition on which the number of occurrences of the transaction is equal to or larger than a predetermined value, and the processor may be configured to store the journal data or the metadata in the first memory corresponding to identifying that the number of occurrences of the transaction is equal to or larger than the predetermined value.

In the electronic device according to various embodiments of the disclosure, the processor may be configured to activate a timer indicating that a predetermined time has elapsed corresponding to the creation of the thread, and store the journal data or the metadata in the first memory corresponding to identifying that the predetermined time has elapsed.

In the electronic device according to various embodiments of the disclosure, the processor may be configured to: correct a file of the operation result corresponding to detection of a creation of another transaction while the timer is activated, and reset the timer corresponding to a completion of the correction of the file of the operation result.

Figure 5:
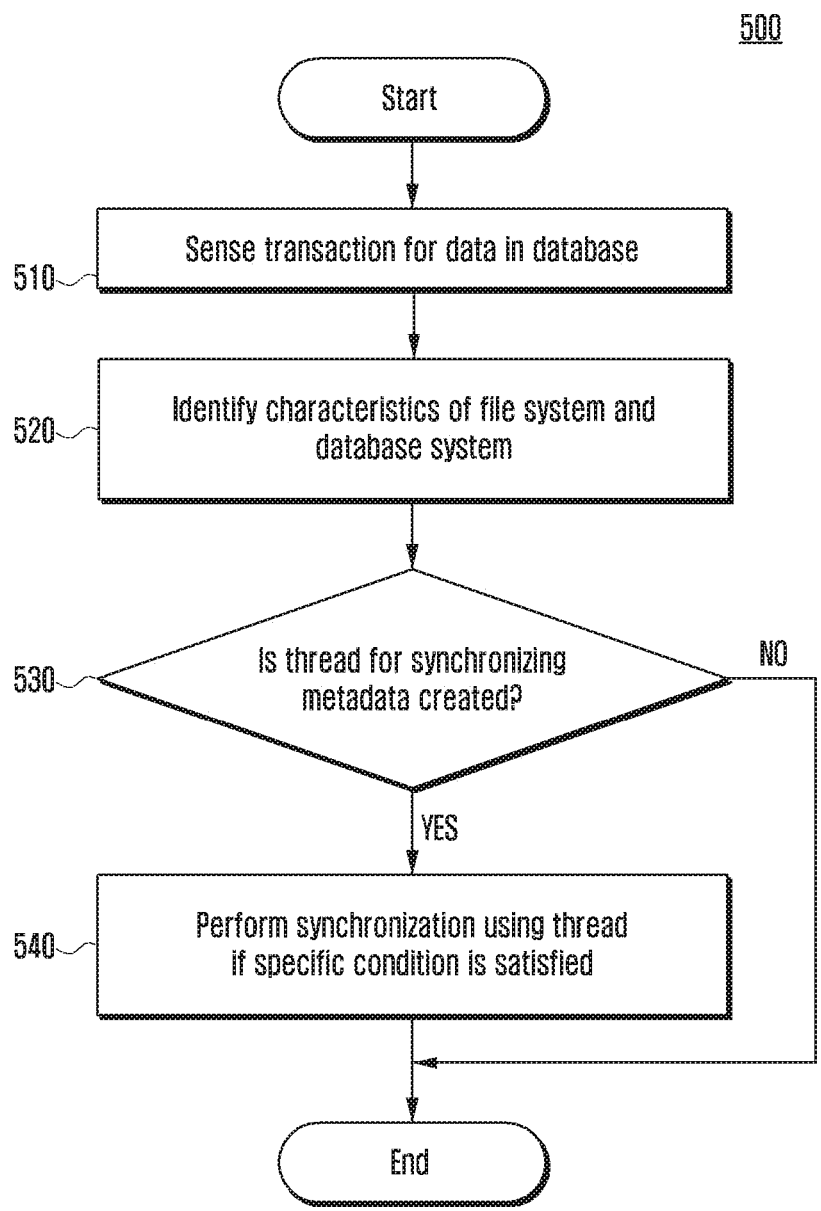
FIG. 5 is a flowchart illustrating a method for operating an electronic device according to an embodiment of the disclosure.

FIG. 5 is a flowchart illustrating a method 500 for operating an electronic device according to an embodiment of the disclosure.

Referring to FIG. 5, according to various embodiments of the disclosure, at operation 510, an electronic device (e.g., electronic device 101 of FIG. 1) (or processor 310) may detect an occurrence of a transaction for data in a database. The transaction may mean various operations including data write, correct, or delete.

According to various embodiments of the disclosure, at operation 520, the electronic device 101 (or processor 310) may identify the characteristics of a database system including data that is a target of the transaction and a file system in which the database system is implemented corresponding to the detection of the occurrence of the transaction. The characteristics of the file system may include the characteristics to indicate whether the file system periodically synchronizes the data (e.g., journal data or metadata) stored in the second memory 330 with the first memory 320. Attributes of the database system may include a journaling scheme of the database system (e.g., a rollback journal mode that means a scheme to store existing data in a journal file and to replace the existing data by corrected data or a write ahead logging (WAL) mode that means a scheme to store the operation result in a journal file and to update the existing data using the journal file) and a synchronization scheme of the database system (e.g., a full synchronization mode that is a synchronization mode for performing synchronization for the database whenever the transaction of the data is completed, a normal synchronization mode that is a synchronization mode for performing synchronization for the database if a specific condition is satisfied, and a synchronization off mode for not performing a separate synchronization.

According to various embodiments of the disclosure, at operation 530, the electronic device 101 (or processor 310) may determine whether to create a thread for synchronizing, with the database, the journal data indicating the operation result of the transaction based on the characteristics of the database system.

According to various embodiments of the disclosure, the electronic device 101 may identify the characteristics of the database system including the data corresponding to the transaction and the characteristics of the file system in which the database system is implemented, and may identify whether the database system corresponds to a database system having high risks of data loss based on the characteristics of the file system and the database system. For example, the electronic device 101 may determine that the file system in which the specific database system is implemented corresponds to the file system (e.g., file system in which the data is not periodically synchronized) having a high possibility of a loss of data (e.g., journal data or metadata), and that the system in which the signal (e.g., fsync or fdatasync) for synchronizing the journal data or the metadata with the first memory 320 is not created corresponding to the occurrence of the transaction is the database system having a high data loss. For example, if the journaling type of the specific database system is the WAL mode and the synchronization type is set to the normal mode, the specific database system corresponds to the system in which the signal (e.g., fsync or fdatasync) for synchronizing the journal data or the metadata is not created corresponding to the occurrence of the transaction, and this system may correspond to the database system having the high risks of data loss. As another example, if the synchronization type of the specific database system is set to the synchronization off mode, the specific database system corresponds to the system in which the signal (e.g., fsync or fdatasync) for synchronizing the journal data or the metadata is not created corresponding to the occurrence of the transaction, and this system may correspond to the database system having the high risks of data loss.

According to various embodiments of the disclosure, the electronic device 101 may identify that the database system is the system that is driven in a database journal mode in which the signal (e.g., fsync or fdatasync) for synchronizing the journal data or the metadata is not created corresponding to the occurrence of the transaction, and may create the thread for synchronizing the journal data or the metadata with the first memory 320.

According to various embodiments of the disclosure, at operation 540, the electronic device 101 (or processor 310) may synchronize the metadata with the first memory using the created thread corresponding to identifying that the data transaction satisfies the specific condition.

According to various embodiments, the specific condition may include a condition related to a change time of the data. The condition related to the change time of the data may include a condition that means whether a predetermined time has elapsed after a commit operation reflecting a completed data transaction in the journal data is performed. After the commit operation is performed, the electronic device 101 may activate a timer, and may identify whether the predetermined time has elapsed. The electronic device 101 may perform synchronization of the database using the thread corresponding to identifying that the predetermined time has elapsed after the commit operation is performed. The electronic device 101 may reset the timer corresponding to identifying that another data transaction occurs or another commit operation is performed while the predetermined time has elapsed after the commit operation is performed. The electronic device 101 may identify whether the predetermined time has elapsed, and may perform the synchronization of the journal data or the metadata using the thread corresponding to identifying that the predetermined time has elapsed.

According to various embodiments of the disclosure, the specific condition may include the condition related to the degree of change of the data. The condition related to the degree of the change of the data is a variable capable of representing the degree of the change of the data (e.g., the number of data transaction calls or the number of updated pages among pages that are data sets), and may mean the condition on which the variable capable of representing the degree of the change is equal to or larger than (or exceeds) a specific value. Data of the variable representing the degree of the change of the data may be included in the database or the journal data. The electronic device 101 may identify whether the data transaction satisfies the specific condition at the time when the data transaction is terminated, and may perform the synchronization of the journal data or the metadata using the thread corresponding to identifying that the specific condition is satisfied.

As described above, the electronic device 101 according to various embodiments of the disclosure may create the thread for synchronizing the journal data or the metadata with the first memory 320 with respect to the database system having the characteristics that a separate synchronization is not performed, and the electronic device 101 may synchronize the journal data or the metadata with the first memory 320 using the created thread. Accordingly, the electronic device 101 can prohibit a loss of massive data.

Figure 6:
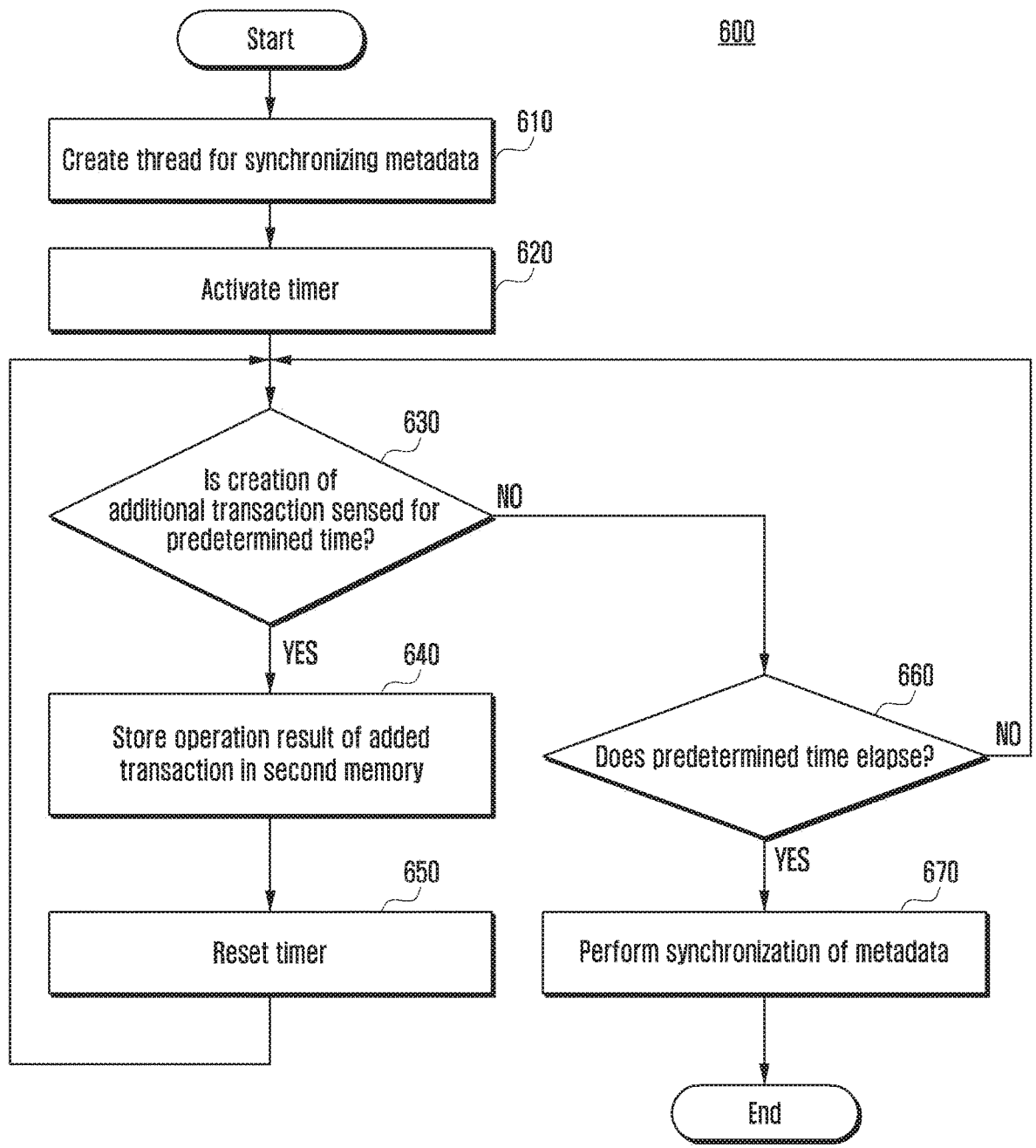
FIG. 6 is a diagram illustrating an embodiment in which an electronic device performs synchronization of a database according to an embodiment of the disclosure.

FIG. 6 is a diagram illustrating an embodiment 600 in which an electronic device performs synchronization of a database in accordance with a condition related to a transaction time according to an embodiment of the disclosure.

Referring to FIG. 6, at operation 610, an electronic device (e.g., electronic device 101 of FIG. 1) (or processor 310) may create a thread for synchronizing journal data (e.g., journal data 433 of FIG. 4) including an operation result of a transaction for data included in a database (e.g., database 421 of FIG. 4) and metadata (e.g., metadata 435 of FIG. 4) indicating an address of the data that is a target of the transaction.

According to various embodiments of the disclosure, synchronization of the journal data 433 or the metadata 435 may mean an operation of storing the journal data 433 or the metadata 435 in the first memory 320.

According to various embodiments of the disclosure, at operation 620, the electronic device 101 (or processor 310) may activate a timer corresponding to the thread creation.

According to various embodiments of the disclosure, activating the timer may mean that the electronic device 101 controls the timer to identify whether a predetermined time has elapsed.

According to various embodiments of the disclosure, at operation 630, the electronic device 101 (or processor 310) may identify whether an additional transaction is created while the predetermined time has elapsed.

According to various embodiments of the disclosure, at operation 640, the electronic device 101 (or processor 310) may store the journal data 433 including the operation result of the added transaction in the second memory (e.g., second memory 330 of FIG. 3) corresponding to detection of the creation of the additional transaction.

According to various embodiments of the disclosure, the electronic device 101 may update the journal data 433 stored in the second memory through reflection of the operation result of the transaction.

According to various embodiments of the disclosure, at operation 650, the electronic device 101 (or processor 310) may reset the timer.

According to various embodiments of the disclosure, the electronic device 101 may reset the timer corresponding to identifying that another data transaction occurs or another commit operation is performed while the predetermined time has elapsed after the commit operation is performed. The timer resetting may mean an operation of identifying whether a newly set time has elapsed using the newly set time regardless of the existing set time. The length of the newly set time and the length of the previously set time may be equal to each other, or may be different from each other in accordance with the operating state of the electronic device 101.

According to various embodiments of the disclosure, at operation 660, if creation of the additional transaction is not detected for a predetermined time (630—NO), the electronic device 101 (or processor 310) may identify whether the predetermined time has elapsed.

According to various embodiments of the disclosure, the elapse of the predetermined time may mean that the condition related to the data change time for performing the synchronization of the database is satisfied.

According to various embodiments of the disclosure, the electronic device 101 may repeatedly perform the operations 630 to 660 if the predetermined time has not elapsed.

According to various embodiments of the disclosure, at operation 670, the electronic device 101 (or processor 310) may perform synchronization to store the journal data 433 or the metadata 435 in the first memory 320 corresponding to identifying that the predetermined time has elapsed.

Figure 7A:
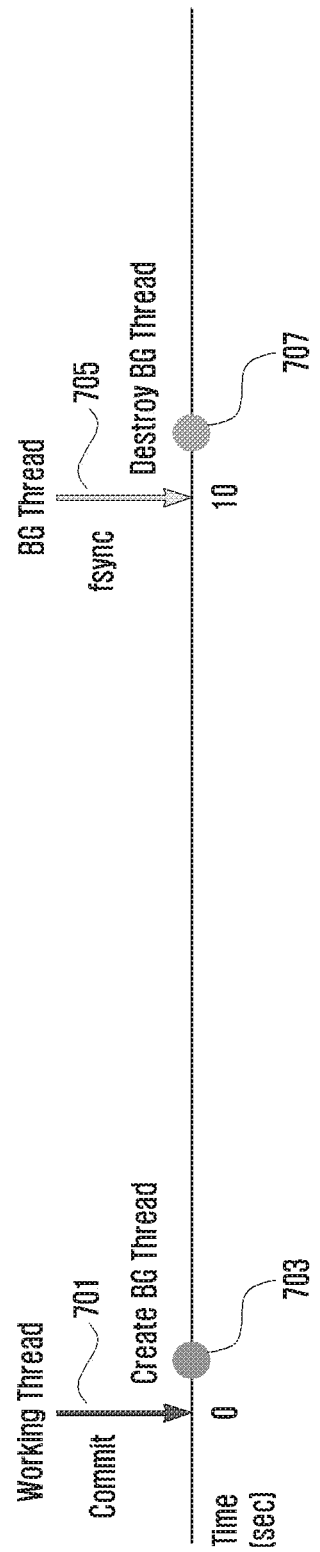
FIG. 7A is a diagram illustrating an embodiment in which an electronic device performs synchronization of a database after a commit operation according to an embodiment of the disclosure.
Figure 7B:
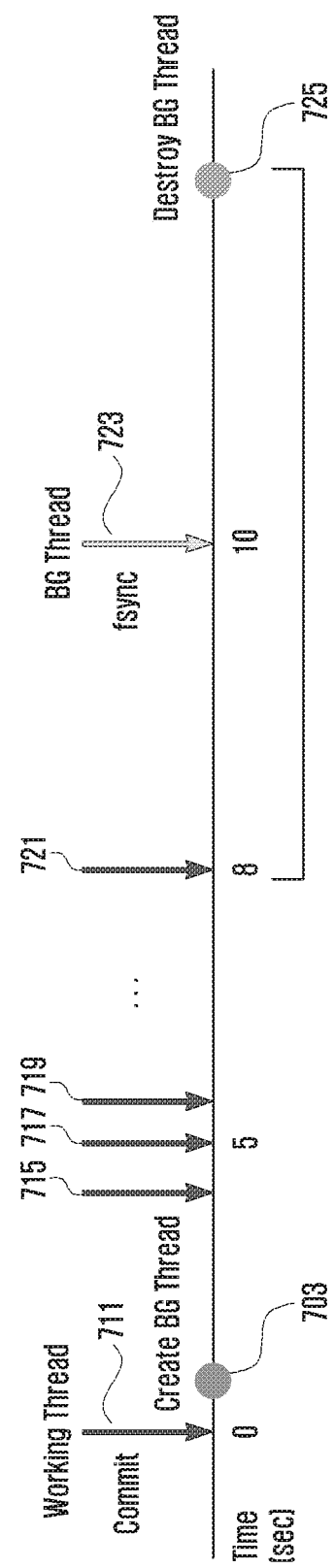
FIG. 7B is a diagram illustrating an embodiment in which an electronic device performs synchronization of a database after a commit operation according to an embodiment of the disclosure.
Figure 7C:
FIG. 7C is a diagram illustrating an embodiment in which an electronic device performs synchronization of a database after a commit operation according to an embodiment of the disclosure.

FIGS. 7A to 7C are diagrams illustrating embodiments in which an electronic device performs synchronization of a database after a commit operation according to various embodiments of the disclosure.

Referring to FIG. 7A, the electronic device (e.g., electronic device 101 of FIG. 1) according to various embodiments of the disclosure may create (703) a thread for synchronizing the database 421 corresponding to detection of performing of a commit operation (701) in accordance with a transaction of data in the database (e.g., database 421 of FIG. 4).

According to various embodiments of the disclosure, the electronic device 101 may synchronize (705) the database 421 using the created thread if a predetermined time (e.g., 10 sec) has elapsed from the time when the commit operation (701) is performed. The electronic device 101 may destroy (or delete 707) the thread after a specific time after completion of the synchronization of the database 421.

The embodiment as described above with reference to FIG. 6 is the embodiment in which the database (e.g., database 421 of FIG. 4) is synchronized after the predetermined time elapses, starting from the commit occurring at the latest if a plurality of commits occur. According to various embodiments of the disclosure, various synchronization time points may be set.

Referring to FIG. 7B, it illustrates a situation in which a plurality of commits 715, 717, 719, and 721 occur during the past predetermined time after an initial commit occurs (711).

The electronic device 101 according to various embodiments of the disclosure may create (713) a thread for synchronizing the database 421 corresponding to detection of performing of a commit operation (711) in accordance with a transaction of data in the database 421.

If a plurality of commits 715, 717, 719, and 721 occur for a predetermined time (e.g., 10 sec), the electronic device 101 may perform (723) synchronization of the database 421 corresponding to identifying that the predetermined time (e.g., 10 sec) has elapsed from the initially occurring commit 711. The electronic device 101 may destroy (or delete 725) the thread after the predetermined time (e.g., 10 sec) from the time when the last commit 721 occurs.

Referring to FIG. 7C, it illustrates a situation in which a plurality of commits 735, 737, and 739 occur during a predetermined time after an initial commit occurs (731).

The electronic device 101 according to various embodiments of the disclosure may create (733) a thread for synchronizing the journal data 433 or the metadata 435 corresponding to detection of performing of a commit operation (731) in accordance with a transaction of data in the database 421.

According to various embodiments of the disclosure, if a plurality of commits 735, 737, and 739 occur for a predetermined time (e.g., 5 sec), the electronic device 101 may perform (723) synchronization of the journal data 433 or the metadata 435 corresponding to identifying that a predetermined time (e.g., 10 sec) has elapsed from the initially occurring commit 731.

According to various embodiments of the disclosure, the electronic device 101 may synchronize (741) the database 421 using the created thread if a predetermined time (e.g., 10 sec) has elapsed from the time when the commit operation (731) is performed. The electronic device 101 may destroy (or delete 743) the thread after a specific time after completion of the synchronization of the database 421.

According to various embodiments of the disclosure, if all the plurality of commits occur within a specific time (e.g., 5 sec), the electronic device 101 may maintain the thread destroy time as it is. The electronic device 101 may destroy (or delete) the thread after the predetermined time (e.g., 10 sec) from the time when the initial commit 731 occurs.

In the case of the embodiment illustrated in FIG. 7B, the electronic device 101 may identify the occurrence of the commits 719 and 721 even after the specific time (e.g., 5 sec). In this case, the electronic device 101 may postpone the thread destroy (or delete) time after a predetermined time from the time when the last commit 721 occurs.

In the case of the embodiment illustrated in FIG. 7C, the electronic device 101 may identify that the commit does not occur after the specific time (e.g., 5 sec). In this case, the electronic device 101 may destroy (or delete) the thread after the predetermined time (e.g., 10 sec) from the time when the initial commit 731 occurs.

Figure 8:
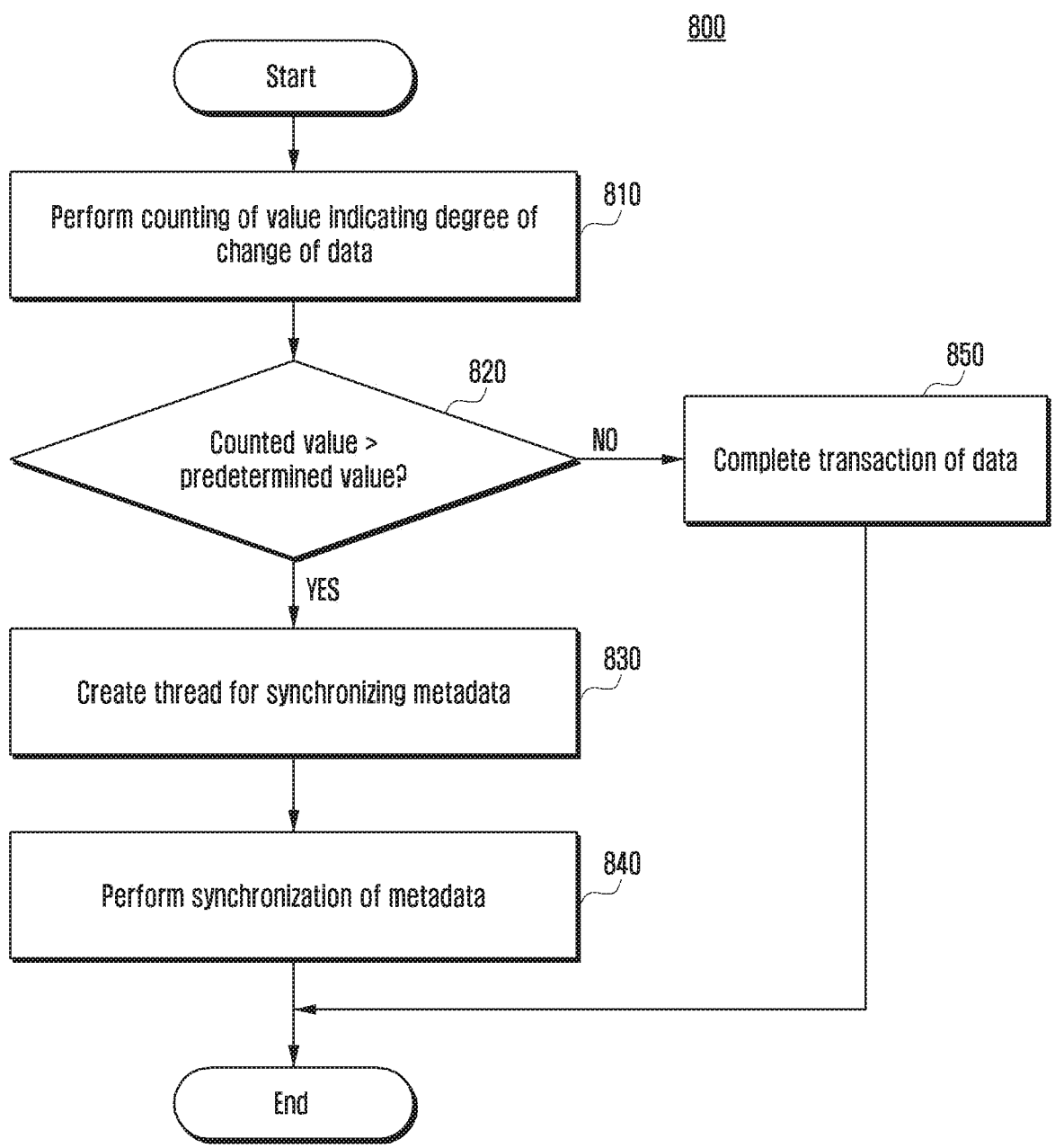
FIG. 8 is a diagram illustrating an operation in which an electronic device performs synchronization of a database in accordance with a degree of change of data according to an embodiment of the disclosure.

FIG. 8 is a diagram illustrating an operation (800) in which an electronic device performs synchronization of a database in accordance with a degree of change of data according to an embodiment of the disclosure.

Referring FIG. 8, at operation 810, the electronic device 101 (e.g., electronic device 101 of FIG. 1) (or processor 310) may perform counting of a value indicating the degree of change of data.

According to various embodiments of the disclosure, the value capable of representing the degree of the change of the data may mean the number of data transaction calls or the number of updated pages among pages that are data sets. The electronic device may identify the number of data transaction calls or the number of updated pages in real time, may generate the data transaction call, or may increase the count value if a new page is updated.

According to various embodiments of the disclosure, at operation 820, the electronic device 101 (or processor 310) may identify whether the count value exceeds (or is equal to or larger than) a predetermined value.

According to various embodiments of the disclosure, the case where the count value exceeds (or equal to or larger than) the predetermined value may mean that the condition related to the degree of the change of the data is satisfied.

According to various embodiments of the disclosure, if the count value does not exceed (or equal to or smaller than) the predetermined value, the electronic device 101 may perform the operation described at operation 850. If the count value does not exceed (or equal to or smaller than) the predetermined value, the electronic device 101 may complete the transaction of the data. The electronic device 101 may correct the count value corresponding to completion of the data transaction. The electronic device 101 may not perform the synchronization of the journal data 433 or the metadata 435.

According to various embodiments of the disclosure, at operation 830, the electronic device 101 (or processor (e.g., processor 310 of FIG. 3)) may create the thread for synchronizing the journal data (e.g., journal data 433 of FIG. 4) including the operation result of the transaction or the metadata (e.g., metadata 435 of FIG. 4) including the address of the data that is the target of the transaction corresponding to identifying that the count value exceeds (or equal to or larger than) the predetermined value.

According to various embodiments of the disclosure, at operation 840, the electronic device 101 (or processor 310) may perform the synchronization of the journal data 433 or the metadata 435 using the thread created at operation 830.

A method for operating an electronic device according to various embodiments of the disclosure may include detecting an occurrence of a transaction for data in a database stored in a first memory, identifying characteristics of a database system to which the data corresponding to the transaction belongs and a file system in which the database system is implemented corresponding to the detection of the occurrence of the transaction, determining whether to create a thread for synchronizing, with the first data, journal data including an operation result of the transaction stored in a second memory and metadata including address information of the data that is a target of the transaction based on the characteristics of the file system and the database system, and synchronizing the journal data or the metadata with the first memory using the created thread corresponding to identifying that the transaction of the data satisfies a condition related to a degree of change of the data or a condition related to a change time of the data.

In the method for operating the electronic device according to various embodiments of the disclosure, the first memory may be a nonvolatile memory, and the second memory may be a volatile memory.

In the method for operating the electronic device according to various embodiments of the disclosure, an attribute of the database system may include a journaling type of the database system or a synchronization type of the database system.

The method for operating the electronic device according to various embodiments of the disclosure may further include updating the journal data and the metadata based on the operation result of the transaction.

The method for operating the electronic device according to various embodiments of the disclosure may further include updating the journal data so as to reflect the operation result of the transaction corresponding to the occurrence of the transaction, synchronizing the journal data and the metadata using the created thread, and updating the database based on the journal data and the metadata synchronized with the first memory.

In the method for operating the electronic device according to various embodiments of the disclosure, the condition related to the degree of the change of the data may include a condition on which the number of updated pages among pages included in the database is equal to or larger than a predetermined value, and synchronizing the journal data or the metadata may include synchronizing the journal data or the metadata with the first memory corresponding to identifying that the number of updated pages is equal to or larger than the predetermined value.

In the method for operating the electronic device according to various embodiments of the disclosure, the condition related to the degree of the change of the data may include a condition on which the number of occurrences of the transaction is equal to or larger than a predetermined value, and synchronizing the journal data or the metadata may include synchronizing the journal data or the metadata with the first memory corresponding to identifying that the number of occurrences of the transaction is equal to or larger than the predetermined value.

In the method for operating the electronic device according to various embodiments of the disclosure, the condition related to the degree of the change of the data may include a condition on which a predetermined time set by a timer has elapsed corresponding to the creation of the thread, and synchronizing the journal data or the metadata includes synchronizing the journal data or the metadata with the first memory corresponding to identifying that the predetermined time has elapsed.

The method for operating the electronic device according to various embodiments of the disclosure may further include inactivating the timer corresponding to detection of a creation of another transaction while the timer is activated, and resetting the timer corresponding to a completion of the other transaction.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first memory configured to store a database therein;
a second memory configured to store therein journal data including an operation result of a transaction for data in the database and metadata including address information of the data that is a target of the transaction; and
at least one processor configured to:
   detect an occurrence of the transaction,
   identify attributes of a database system to which the data corresponding to the transaction belongs and attributes of a file system in which the database system is implemented in response to the detection of the occurrence of the transaction,
   determine whether to create a thread for synchronizing the metadata stored in the second memory with the first memory based on the attributes of the file system and the attributes of the database system, and
   synchronize the metadata with the first memory using the created thread in response to identifying that the transaction of the data satisfies a condition related to a degree of change of the data in the database or a condition related to a change time of the data in the database,
wherein the attributes of the database system comprise an attribute indicating whether a signal for synchronizing the metadata with the database is created corresponding to the occurrence of the transaction, and
wherein the at least one processor is further configured to determine to create the thread corresponding to identifying that the file system does not correspond to a file system periodically synchronizing the journal data or the metadata with the first memory and the database system is a database system having attributes that the signal for synchronizing the metadata is not created.

2. The electronic device of claim 1, wherein the first memory includes a nonvolatile memory, and the second memory includes a volatile memory.

3. The electronic device of claim 1, wherein the attributes of the database system comprise a journaling type of the database system or a synchronization type of the database system.

4. The electronic device of claim 3,
wherein the at least one processor is further configured to determine to create the thread corresponding to identifying that the journaling type of the database system is set to a write ahead logging (WAL) mode, and
wherein the synchronization type of the database system is set to a normal mode.

5. The electronic device of claim 1, wherein the at least one processor is further configured to update the journal data and the metadata stored in the second memory based on the operation result of the transaction.

6. The electronic device of claim 1, wherein the at least one processor is further configured to:
update the journal data so as to reflect the operation result of the transaction stored in the second memory corresponding to the occurrence of the transaction,
store the journal data and the metadata in the first memory, and
update the database based on the journal data and the metadata stored in the first memory.

7. The electronic device of claim 1,
wherein the condition related to the degree of the change of the data comprises a condition on which a number of updated pages among pages included in the database is equal to or larger than a predetermined value, and
wherein the at least one processor is further configured to store the journal data or the metadata in the first memory corresponding to identifying that the number of updated pages is equal to or larger than the predetermined value.

8. The electronic device of claim 1,
wherein the condition related to the degree of the change of the data comprises a condition on which a number of occurrences of the transaction is equal to or larger than a predetermined value, and
wherein the at least one processor is further configured to store the journal data or the metadata in the first memory corresponding to identifying that the number of occurrences of the transaction is equal to or larger than the predetermined value.

9. The electronic device of claim 1, wherein the at least one processor is further configured to:
activate a timer for indicating whether a predetermined time has elapsed since creation of the thread, and
store the journal data or the metadata in the first memory corresponding to identifying that the predetermined time has elapsed.

10. The electronic device of claim 9, wherein the at least one processor is further configured to:
correct a file of the operation result corresponding to detection of a creation of another transaction while the timer is activated, and
reset the timer corresponding to a completion of the correction of the file of the operation result.

11. A method for operating an electronic device, the method comprising:
detecting an occurrence of a transaction for data in a database stored in a first memory;
identifying attributes of a database system to which the data corresponding to the transaction belongs and a file system in which the database system is implemented in response to the detection of the occurrence of the transaction;
determining whether to create a thread for synchronizing, with the first memory, journal data including an operation result of the transaction stored in a second memory and metadata including address information of the data that is a target of the transaction based on the attributes of the file system and the database system; and
synchronizing the journal data or the metadata with the first memory using the created thread in response to identifying that the transaction of the data satisfies a condition related to a degree of change of the data in the database or a condition related to a change time of the data in the database,
wherein the attributes of the database system comprise an attribute indicating whether a signal for synchronizing the metadata with the database is created corresponding to the occurrence of the transaction, and
wherein the method is further comprises determining to create the thread corresponding to identifying that the file system does not correspond to a file system periodically synchronizing the journal data or the metadata with the first memory and the database system is a database system having attributes that the signal for synchronizing the metadata is not created.

12. The method of claim 11, wherein the first memory includes a nonvolatile memory, and the second memory includes a volatile memory.

13. The method of claim 11, wherein the attributes of the database system comprise a journaling type of the database system or a synchronization type of the database system.

14. The method of claim 11, further comprising updating the journal data and the metadata based on the operation result of the transaction.

15. The method of claim 11, further comprising:
updating the journal data so as to reflect the operation result of the transaction corresponding to the occurrence of the transaction;
synchronizing the journal data and the metadata using the created thread; and
updating the database based on the journal data and the metadata synchronized with the first memory.

16. The method of claim 11,
wherein the condition related to the degree of the change of the data includes a condition on which a number of updated pages among pages included in the database is equal to or larger than a predetermined value, and
wherein the synchronizing of the journal data or the metadata comprises synchronizing the journal data or the metadata with the first memory corresponding to identifying that the number of updated pages is equal to or larger than the predetermined value.

17. The method of claim 11,
wherein the condition related to the degree of the change of the data includes a condition on which a number of occurrences of the transaction is equal to or larger than a predetermined value, and
wherein the synchronizing of the journal data or the metadata comprises synchronizing the journal data or the metadata with the first memory corresponding to identifying that the number of occurrences of the transaction is equal to or larger than the predetermined value.

18. The method of claim 11,
wherein the condition related to the degree of the change of the data includes a condition on which a predetermined time set by a timer has elapsed since creation of the thread, and
wherein the synchronizing of the journal data or the metadata comprises synchronizing the journal data or the metadata with the first memory corresponding to identifying that the predetermined time has elapsed.

19. The method of claim 18, further comprising:
inactivating the timer corresponding to detection of a creation of another transaction while the timer is activated; and
resetting the timer corresponding to a completion of the other transaction.

* * * * *